United States Patent [19]

Kmetec

[11] Patent Number: 5,774,488
[45] Date of Patent: Jun. 30, 1998

[54] SOLID-STATE LASER WITH TRAPPED PUMP LIGHT

[75] Inventor: Jeffrey D. Kmetec, Los Gatos, Calif.

[73] Assignee: Lightwave Electronics Corporation, Mountain View, Calif.

[21] Appl. No.: 268,781

[22] Filed: Jun. 30, 1994

[51] Int. Cl.$^6$ .................................................. H01S 3/094
[52] U.S. Cl. ................................. 372/69; 372/68; 372/70; 372/35; 372/36
[58] Field of Search ................................. 372/70, 75, 68, 372/69, 34, 35, 36

[56] References Cited

U.S. PATENT DOCUMENTS

| | | | |
|---|---|---|---|
| 3,683,296 | 8/1972 | Scalise | 331/94.5 |
| 3,684,980 | 8/1972 | Kay | 331/94.5 |
| 3,821,663 | 6/1974 | Brenner | 372/36 |
| 4,594,716 | 6/1986 | Guch, Jr. | 372/35 |
| 4,908,832 | 3/1990 | Baer | 372/75 |
| 4,916,712 | 4/1990 | Bender | 372/75 |
| 4,949,346 | 8/1990 | Kuper et al. | 372/36 |
| 4,969,155 | 11/1990 | Kahan | 372/70 |
| 5,033,058 | 7/1991 | Cabaret et al. | 372/70 |
| 5,048,044 | 9/1991 | Ireland | 372/66 |
| 5,103,457 | 4/1992 | Wallace et al. | 372/92 |
| 5,172,388 | 12/1992 | Long et al. | 372/70 |
| 5,243,615 | 9/1993 | Ortiz et al. | 372/68 |
| 5,317,585 | 5/1994 | Gregor | 372/75 |

FOREIGN PATENT DOCUMENTS

| | | | |
|---|---|---|---|
| 2-54588 | 2/1990 | Japan | 372/75 |
| 5-335662 | 12/1993 | Japan | 372/75 |

OTHER PUBLICATIONS

Welford et al., "Efficient $TEM_{00}$–mode operation of a laser–diode side–pumped Nd:YAG laser," *Optics Letters*, vol. 16, Dec. 1991, pp. 1850–1852.

Marshall et al., "Highly efficient $TEM_{00}$ operation of transversely diode–pumped Nd:YAG lasers," *Optics Letters*, vol. 17, Feb. 1992, pp. 186–188.

Hanson et al., "Laser Diode side pumping of neodymium laser rods," *Applied Optics*, vol. 27, Jan. 1988. pp.80–83.

Ajer et al., "Efficient diode–laser side–pumped $TEM_{00}$–mode Nd:YAG laser," *Optics Letters*, vol. 17, Dec. 1992, pp. 1785–1787.

Oka et al., "Stable intracavity doubling of orthogonal linearly polarized modes in diode–pumped Nd:YAG laser," *Optics Letters*, vol. 13, Oct. 1988, pp. 805–807.

*Primary Examiner*—Rodney B. Bovernick
*Assistant Examiner*—Yisun Song
*Attorney, Agent, or Firm*—Charles S. Guenzer

[57] ABSTRACT

A solid-state laser in which a rod (10) of lasing material is held within an optical cavity formed within a cooling block (40) having a highly surface facing the rod. A longitudinal slit (44) formed in the block from the optical cavity to the outside allows the pumping light from an emission line (36) of semiconductor stripe lasers (30) fabricated on a laser bar (28) to irradiate the laser rod and multiply reflect within the optical cavity. Thereby, pump light is efficiently absorbed by the laser rod, and the laser rod is thermally controlled. Alternatively, cooling liquid (124) can flow axially along the laser rod and within an axially extending optical cavity formed by a reflective coating (125) deposited on a tube (122) enclosing the cooling liquid and having a slit (126) through which pump light is irradiated.

10 Claims, 7 Drawing Sheets

SOLID-STATE LASER WITH TRAPPED PUMP LIGHT

GOVERNMENT INTEREST

This invention was partially made under Grant III-9261669 from the National Science Foundation and the government has certain rights in it.

FIELD OF THE INVENTION

The invention in general relates to solid-state lasers and other non-linear optical devices, and in particular it relates to confinement of pumping light to the lasing medium.

BACKGROUND ART

Optically pumped, solid-state lasers have been long known but continue to offer superior performance in many applications. Such lasers include an optically active medium having multiple energy levels which is pumped by a high energy optical signal so as to invert the population densities of the energy level. The lasing medium then lases at a somewhat lower energy or longer wavelength. The same phenomenon can be used not only for lasers but also for optical amplifiers and other optical devices.

In a conventional configuration, as illustrated in FIG. 1, a cylindrical rod 10 of doped YAG (yttrium aluminum garnet) has its longitudinal axis 12 colinearly oriented with a flashtube 14 within an optical cavity 16. A flashtube 14 produces non-coherent light having some of its optical spectrum near a pump wavelength $\lambda_p$ (or pump frequency $\omega_p = 2\pi c/\lambda_p$, where c is the speed of light). The inner surface 18 of the optical cavity 16 may either specularly or diffusely reflect the light. The pump light strikes the lasing rod 10 and causes it to lase at a wavelength $\lambda_1$ greater than $\lambda_p$. The light from the flashtube 14 excites dopant ions (neodymium in the case of Nd:YAG) within the lasing rod 10 to higher states. When the ions relax to the lower energy state, they emit light, and, at a sufficiently high optical flux, the rod 10 lases to produce a high-intensity output.

However, the conventional flashtube laser has several disadvantages. Total efficiencies are generally limited to less than a few percent. Furthermore, the side-pumped, flashlamp configuration of FIG. 1 is generally limited to relatively low optical powers when the lasing mode is restricted to the preferred fundamental TEM$_{00}$ mode. The laser rod 10 needs to have a relatively small diameter, generally on the order of 1 mm, in order to preferentially excite the TEM$_{00}$ mode. However, such a small rod has a correspondingly small cross section for intercepting light bouncing in the inevitably imperfectly reflecting cavity 16. Furthermore, the flashlamp emits substantial energy that does not contribute to the pumping energy at $\lambda_p$. The lost energy is converted to thermal energy which heats the laser rod 10. Thermal gradients in the laser rod 10 produces undesirable birefringence. The flashlamp geometry of FIG. 1 does not easily allow cooling of the laser rod 10.

The development of high-power semiconductor laser diodes has allowed the end-pumped configuration illustrated in FIG. 2. Laser diodes are very efficient in that 30 to 45% of the electrical energy input into the diode is emitted as laser light. The laser diodes can be either directly coupled into the laser rod 10 or via an optical fiber 20. Mirrors 22 and 24 define a laser cavity on either end of the laser rod 10. Typically, the entrance mirror 22 is highly transmitting at the pumping wavelength $\lambda_p$ and highly reflecting at the lasing wavelength $\lambda_1$; and the exit mirror 24 is partially transmitting at $\lambda_1$ to allow lasing light 26 to exit. The end-pumped configuration is particularly advantageous if the pumping beam has a transverse shape closely matched to the gaussian line shape of the TEM$_{00}$ mode within the laser rod 10.

Nonetheless, the end-pumped configuration in conjunction with laser diodes poorly scales to higher power. Lasers with optical output powers of 20 W and up are now available from Opto Power Corp. of Commerce City, Calif. and from SDL, Inc of San Jose, Calif., and they are referred to as diode bars. These bars are primarily composed of GaAs and emit in the 800 nm range. As illustrated in plan view in FIG. 3, such a light diode bar 28 includes a large number of parallel laser stripes 30 formed on a common GaAs substrate 31 that are arranged in groups 32 with gaps 34 between the groups. Each group 32 laterally extends over about 200 82 m, and the entire light diode bar 28 laterally extends over about 1 cm and emits from a line 36 extending over nearly the same distance. The light emission pattern from such a light diode bar 28 is illustrated isometrically in FIG. 4. In the vertical direction, the emission is diffraction limited from the approximately 1-$\mu$m high stripe and has a full vertical angle of 60°. On the other hand, the emissions from the groups 32 have a fun lateral angle of 10°, which still cannot be focused. Only with difficulty can such an emission pattern be impressed on a single optical fiber or into the end of a laser rod.

High-power laser bars have rekindled interest in side-pumped lasers. As illustrated in FIG. 5, the light diode bar 28 has its line 36 of optical outputs parallel to the longitudinal axis 12 of the laser rod 10 with the pump light striking the entire side of the laser rod 10 along substantially the entire length of the rod 10. Diodes bars are characterized by source emission patterns which are long and thin, typically 1-$\mu$m wide and 1-cm long and producing up to 20 W of CW power. Thereby, the high-intensity output of the light diode bar 28 is directly coupled into the laser rod 10 along a substantial portion of its length. Nonetheless, the side-coupled, light diode bar configuration has several related problems. For high absorption from a source on a single side, the pump light is exponentially attenuated. Such an exponential pump light distribution poorly matches the gaussian line shape of the desired TEM$_{00}$ optical mode propagating axially on the rod 10. In this simple illustrated side-pumped structure, uniformity of pump light in the rod 10 varies inversely with the efficiency of absorption of that pump light in the rod 10.

Such uniformity and efficiency difficulties have been addressed for a lasing medium in the form of a bar or slab, i.e., a rectangular rather than cylindrical member, even though a rectangular geometry does not accommodate the desired circular TEM$_{00}$ mode. As disclosed by Bender in U.S. Pat. No. 4,916,712, by Kuper et al. in U.S. Pat. No. 4,949,346, and by Ireland in U.S. Pat. No. 5,048,044, one or both opposing walls of the laser slab are configured to multiply reflect light axially along the slab. Thereby, the pump light is homogenized in the lasing medium and is completely absorbed therein if reflection losses are ignored. Baer describes in U.S. Pat. No. 4,908,832 a related geometry in which the lasing light rather than the pump light is multiply reflected within the laser slab. However, these solutions do not address the thermal problem of high power lasers. Furthermore, these solutions often need to be matched to the characteristics of the diode lasers being used. However, diode bars exhibit a great number of variations, including the spacing of the laser stripes along the typical 1-cm length. Such variations arise for special applications, such as producing high peak power for short periods rather than a lower-level CW signal or to optimize the lifetime of the laser diode. Nonetheless, it would be desirable to have a common design for the different applications.

The problem of balancing uniformity and efficiency has been addressed for circular geometries by Hanson et al. in "Laser diode side pumping of neodymium laser rods," Applied Optics, vol. 27, 1988, pp. 80–83 and by Ajer et al. in "Efficient diode-laser side-pumped $TEM_{00}$-mode Nd:YAG laser." Optics Letters, vol. 17, pp. 1785–1787. Hanson et al. cover three-quarters of the rod circumference with a polished foil. Ajer et al. coat the rod with a highly reflective coating except for a 250-$\mu$m wide axial stripe in a rod of 2-mm diameter. Both types of lasers then inject light into the optical cavity through the gap in the reflective surface, and the light is reflected by the reflective surface of the rod. Even the laser of Ajer et al., with a nearly complete reflective surface, shows poor uniformity of pump power. Neither reference addresses the problem of thermal control.

SUMMARY OF THE INVENTION

Accordingly, an object of the invention is to provide a high-power laser, optical amplifier, or other optically interacting device.

It is a further object to provide a laser that provides both efficient transfer of optical energy from the pumping frequency to the lasing frequency but which nonetheless uniformly irradiates the lasing medium with pumping light.

It is yet a further object of the invention to provide a laser design which is scalable to higher powers.

Still another object of the invention is to provide a solid-state laser pumped by a diode bar that is insensitive to variations in the construction and emission patterns of the laser diodes.

The invention may be summarized as an optical engine in which a rod of optically active material is surrounded by a highly reflective layer except for a longitudinal slit through which a distributed light emitter, such as a laser diode, injects light into the optical cavity formed by the reflective layer around the optically active material. Advantageously, the cylindrical rod is in close thermal contact with a thermally conductive body with few or no voids therebetween or with a stream of cooling fluid. Thereby, both the pump light is trapped until it is nearly completely absorbed within the optically active material and further the temperature of the material is controlled. The invention is particularly useful with solid-state lasers.

DETAILED DESCRIPTION OF THE PREFERRED EMBODIMENT

Figure 1:
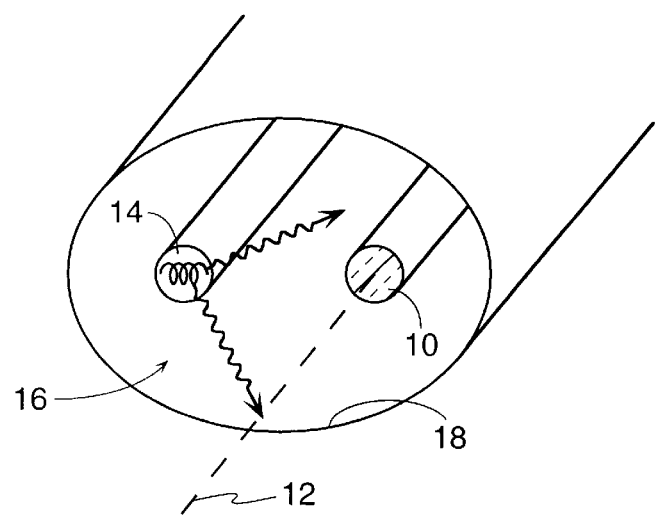
FIG. 1 is a cross-sectional view of a flashlamp laser of the prior art.
Figure 2:
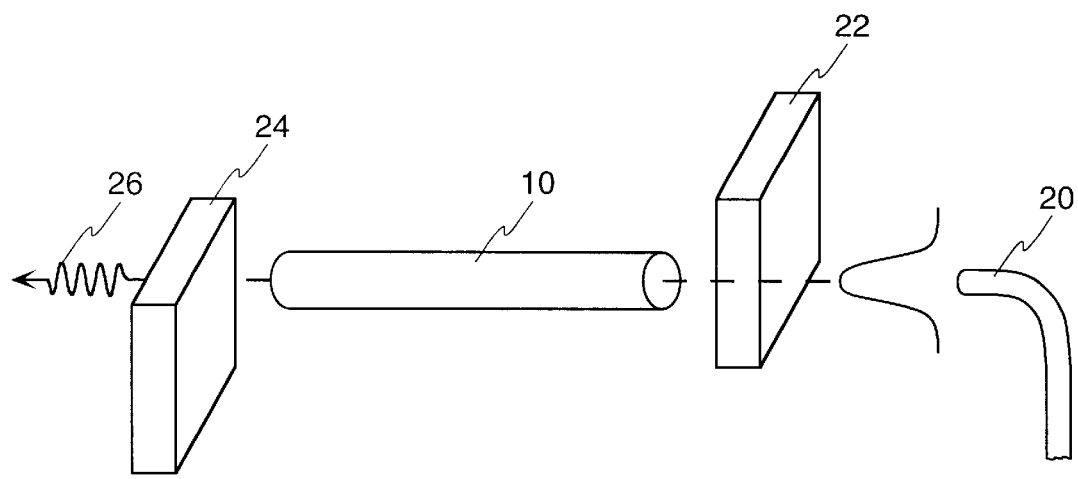
FIG. 2 is an isometric view of an end-pumped laser of the prior art.
Figure 3:
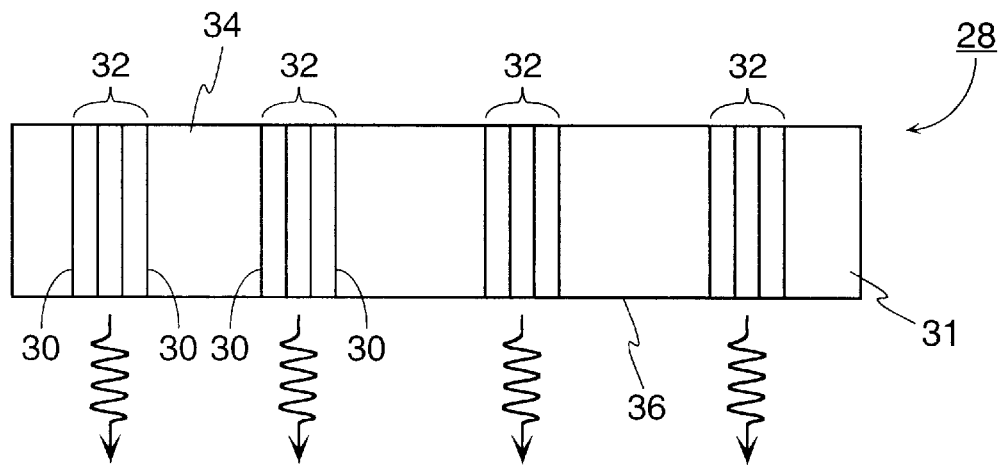
FIG. 3 is a plan view of a laser bar of the prior art.
Figure 4:
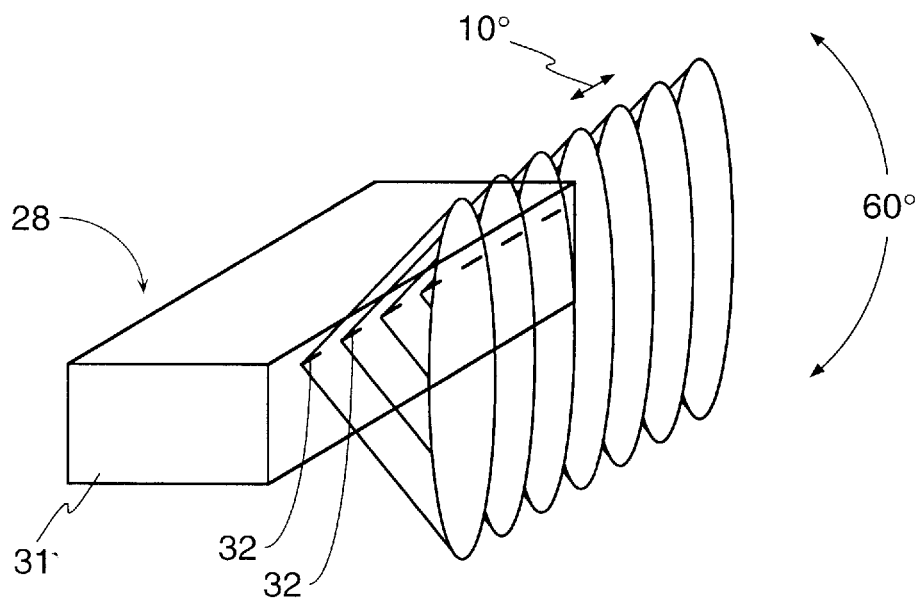
FIG. 4 is an isometric view of the optical emission pattern from the laser bar of FIG. 3.
Figure 5:
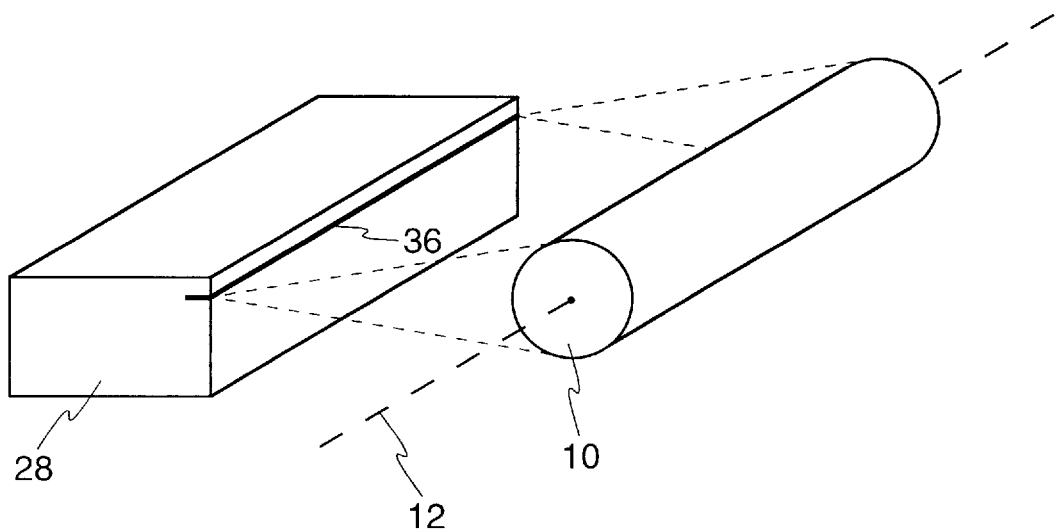
FIG. 5 is an isometric view of a side-pumped laser of the prior art.
Figure 6:
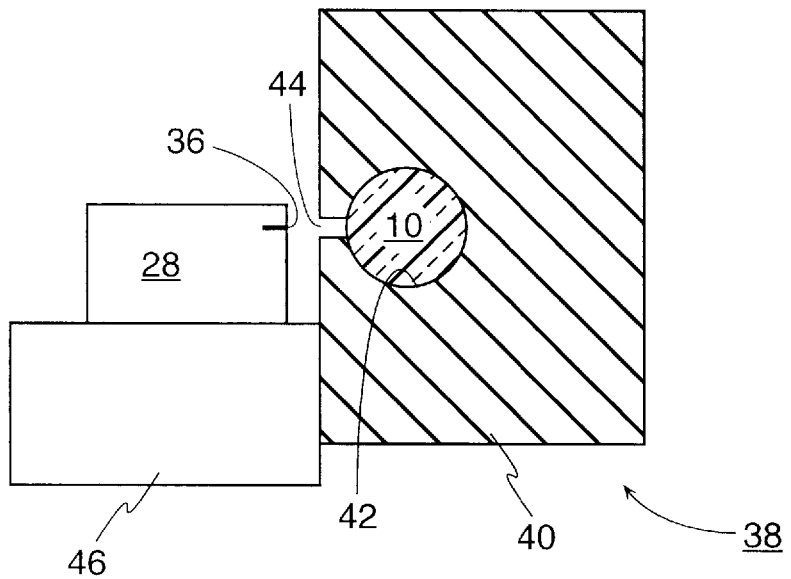
FIG. 6 is a cross-sectional view of a first major embodiment of a side-pumped light engine of the invention.
Figure 7:
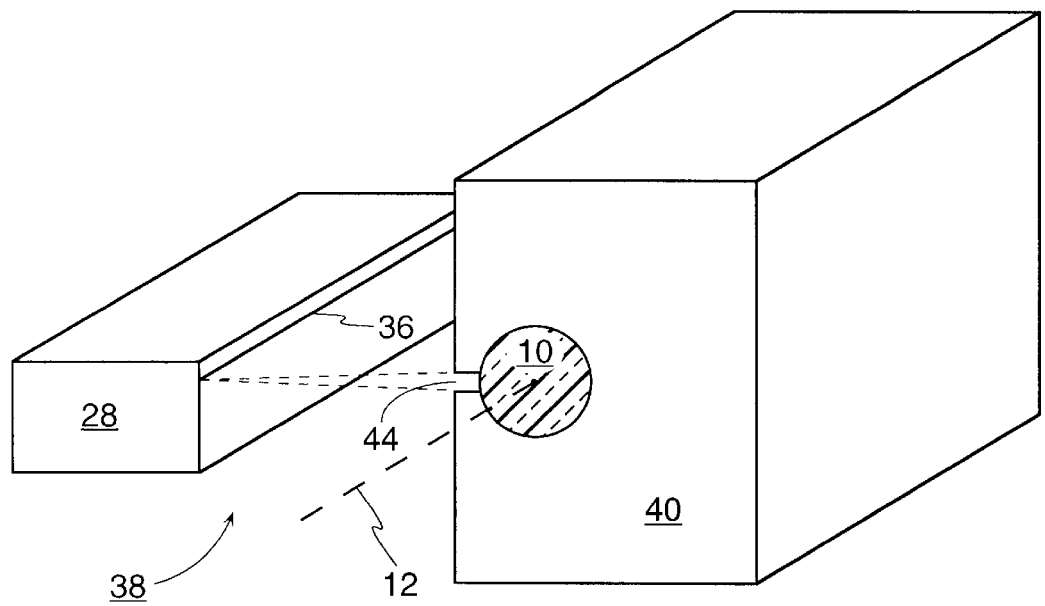
FIG. 7 is an isometric view of the inventive light engine of FIG. 6.

A first embodiment of an optical engine 38 of the invention is illustrated in cross section in FIG. 6 and isometrically in FIG. 7. The laser rod 10 is embedded in a cylindrical cavity in a solid block 40 of copper or other highly thermally conductive material and tightly thermally contacts the copper block 40. A surrounding surface 42 of the cylindrical cavity is coated with gold so as to reflect light with high efficiency. A linear slit 44 is formed between the cylindrical cavity and the exterior of the copper block 40 and is sized to closely accommodate the 60° vertical emission angle from the stripe 36 of the photo-diode bar 28 with perhaps a few reflections within the slit 44. The diameter of the rod 10, that is, its dimension along the pump incidence direction, is preferably a small fraction, e.g. less than ½, of the absorption length of the pump light within the rod 10, which low absorption is in direct contrast to the conventional practice for side-pump lasers. As a result, light emitted from the photo-diode bar 28 through the slit 44 traverses the laser rod 10 many times as it is multiply reflected by the gold-coated copper block 40. The cylindrical cavity of the copper block 40 serves as an optical trap so that all the incident light, minus any reflectivity losses at the gold coating and back reflections through the slit 44, is absorbed by the laser rod 10.

Even with the nearly optimal optical absorption, the lasing medium in the rod 10 is not totally efficient, and a large fraction of the absorbed optical pump power is dissipated as heat. The configuration of FIGS. 6 and 7, however, allows effective thermal coupling by thermal conduction between the laser rod 10 and the copper block 40, which, besides having a large thermal mass, is mounted on a mount 46 that is heat sunk to cooling means, examples of which are chilled water, refrigeration systems, thermoelectric coolers, or finned radiators. Such efficient thermal conduction is especially important for laser rods generating 1W and more of laser power.

It is important that no voids exist in the interface between the copper block 40 and the laser rod 10, which voids would impede the conduction of heat from the rod 10 to the copper block 40. Such voids can be eliminated with, among other means, by transparent adhesives or fillers or by compression of a relatively soft material, such as a properly chosen copper alloy, against the rod.

If desired, optical components, such as cylindrical lenses are inserted between the emission line 36 of the diode bar 28 and the entrance slit 44 to the optical cavity. Such optical components can be used to either transport the optical power to the slit 44 or to shape the emission pattern to alter the illumination of the solid-state laser material.

The invention provides nearly complete optical absorption of the pump light, more uniform light absorption throughout the lasing medium, and efficient thermal control of lasing medium.

The invention is equally applicable to other cross sections of lasing medium, for example slabs, in which the rectangular sides of the slab are juxtaposed to highly reflecting solid surfaces and conductively heat sunk to them.

The optical engine 38 of FIGS. 6 and 7 can be included within a number of optical devices. Mirrors placed at both ends of the rod will form an optical cavity, and at high pump intensities, the device lases. If one of the mirrors is partially transmitting, lasing light exits the cavity through it. Alternatively, the optical engine can be included in a ring laser. The cavity may also include any of the common intra-cavity elements, such as electro-optic or acousto-optic Q-switches, etalons, frequency-doubling crystals, prisms, mode-locking devices, polarizers, etc. These items are used to tailor the output of the laser, that is, to be pulsed, tuneable, spectrally modified, etc. Without the cavity end mirrors, the device operates as an optical amplifier. The optical engine of the invention is compatible with these techniques, and some will be described later by example.

EXAMPLE 1

A piece of copper alloy chosen for its high thermal conductivity and easy machinability was cut to a block approximately 1×1×1.4 cm. A hole having a diameter of 1.2 mm was then drilled to within 300 $\mu$m of the long side, and the drilled hole was then reamed and lapped. The slit 44 was machined from the closest long side to the hole and had a width of 350 $\mu$m running along the entire length of the long side. The preliminary machining was performed to a tolerance of $\frac{1}{10}$ mil (2.5 $\mu$m). The copper piece was then gold coated to produce highly reflective surfaces within both the cylindrical cavity and the slit 44. A laser rod 10 of Nd-doped crystalline YAG having a diameter of 1.2 mm and a length of 1.5 cm was then mounted into the drilled hole with a very thin layer of surrounding transparent adhesive of Sylgard 186 available from Dow Corning Corp. of Midland, Michigan. The rod protruded slightly beyond the ends of the optical cavity in the block. A glass cover glass with an anti-reflection coating and a thickness of 150 $\mu$m was adhered to the side of the block 40 with the slit 44 in order to protect the diode laser and to enhance optical coupling.

The laser bar 28, for example, Model SDL-3470-S available from SDL, Inc. emitting 20 W of optical power, and the copper block 40 were fixed to a common mount 46 such that the line 36 of the laser bar 28 was aligned with the slit 44 of the copper block 40 and separated therefrom by about 200 $\mu$m.

This optical engine, when placed in the cavity described later with reference to FIG. 9, produced 4 W of optically polarized power in the TEM$_{00}$ mode.

EXAMPLE 2

In a second example, the 20-W CW laser was replaced with a 100-W quasi-CW laser, Model SDL-3251-A1 from SDL, Inc. The laser produces 4 mJ per pulse in a nearly diffraction-limited beam. Since both the quasi-CW and the CW diodes have a similar long, thin emitting region, the substitution of diodes is very straightforward. However, a concern is that the optical intensity from a quasi-CW diode bar is so high that the laser rod has sufficient gain to lase in an unintended direction, e.g., transversely across the rod. Such concerns are alleviated if the cavity wall 44 is coated with a dichroic coating that reflects at the pump frequency but not the lasing frequency. A dielectric stack provides such dichroic reflection. Alternatively, the cavity wall 44 can be coated with a layer that is selectively absorbing at the laser frequency.

EXAMPLE 3

In a third example, the mirrors were removed, and an optical signal was input on one side of the rod and output on the other. Each traverse of the 1.2-mm laser rod in conjunction with a 20-W CW diode bar typically produced a 1-dB small signal gain and several watts of saturated optical power while each traverse with a 100-W quasi-CW diode bar produced more than 4 dB of gain.

The optical engine 38 of FIGS. 6 and 7 provides substantially improved uniformity of pump radiation within the laser rod, thus contributing to the desired TEM$_{00}$ laser output mode. Nonetheless, the pump uniformity and mode purity can be further improved while simultaneously increasing the total optical power by arranging three such engines along a common optical path with the bar radiation axes trigonally distributed about the optical axis, i.e., at 0°, 120° and 240°

Figure 8:
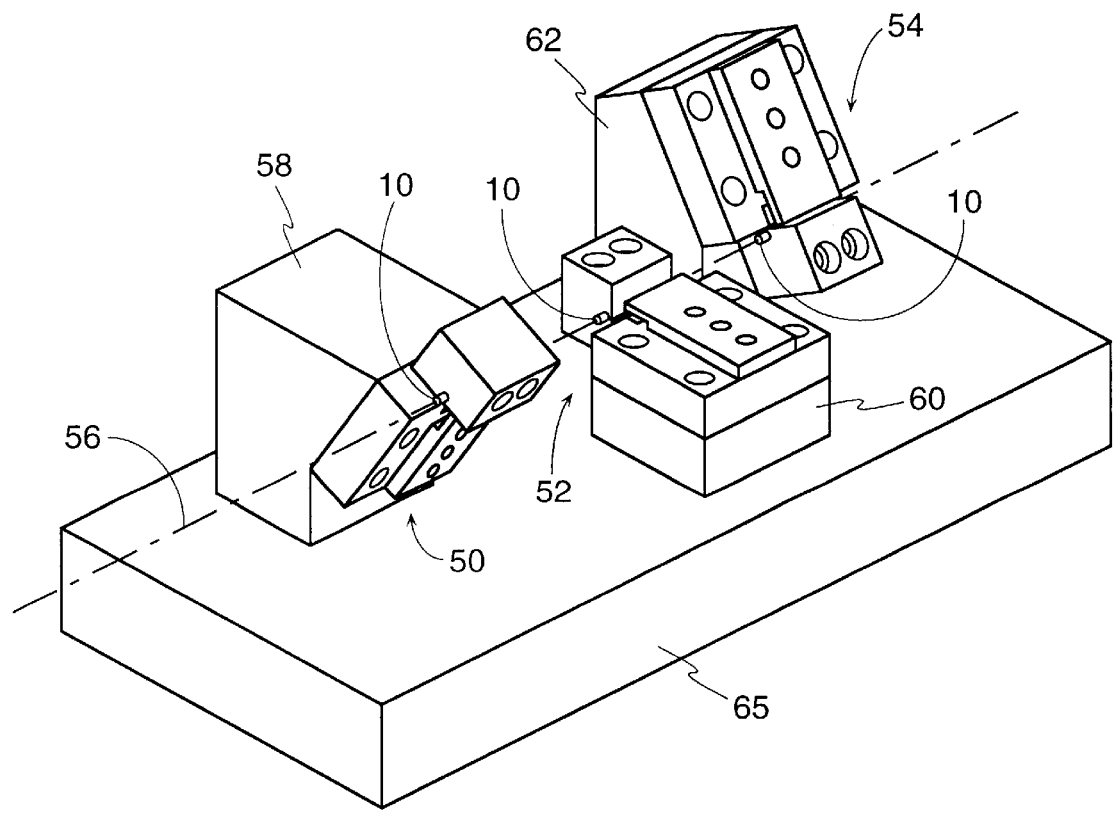
FIG. 8 is an isometric view of a plurality of symmetrically arranged optical engines providing a more uniform, higher-power pump power.
Figure 8A:
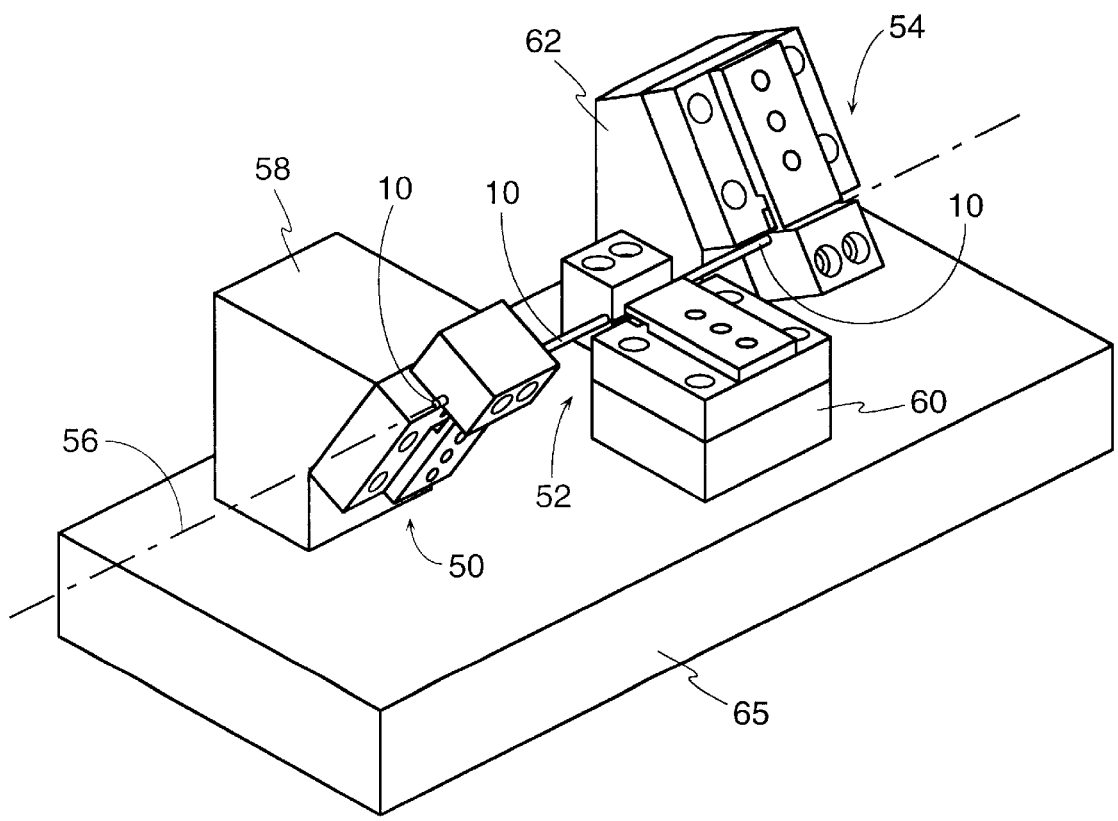
FIG. 8A is an isometric view of an embodiment similar to that of FIG. 8 in which the laser rod is continuous between multiple optical engines.

As illustrated isometrically in FIG. 8, three optical engines 50, 52, and 54, each of the same structure as optical engine 38 of FIG. 6, are arranged with their respective laser rods 10 coaxial along a common optical axis 56. If each of the ends of the rods 10 are flat and perpendicular to the respective rod's longitudinal axis to less than 5 minutes of arc, the alignment between the engines 50, 52, and 54 can be done with a mechanical pin. The engines 50, 52, and 54 are mounted to respective thermally conductive jigs 58, 60, and 62 having faces on which the engines can be mounted so that the respective diode bars irradiate the respective laser rods at three angles offset from each other by 120°. That is, the pump beams are perpendicular to the optical axis but are arranged at equal azimuthal separations within a plane perpendicular to that axis. The jigs 58, 60, and 62 are mounted on a common base that is thermally controlled, e.g., a thermoelectric cooler or the base is brazed to cooling water tubes, so as to maintain the laser rods 10 of all the engines 50, 52, and 54 at a desired operating temperature.

The trigonal arrangement provides a three-fold and possibly six-fold symmetry of pumping light within the laser medium. Other numbers of multiple optical engines could beneficially be used, whether axially displaced as in FIG. 8 or at a same axial point. In particular, two optical engines azimuthally displaced by 90° in the axial arrangement of FIG. 8 provides greatly increased uniformity without undue complexity.

EXAMPLE 4

Figure 9:
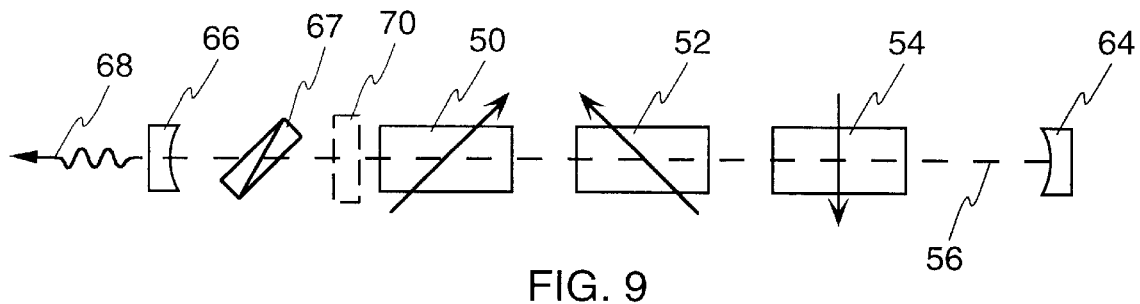
FIG. 9 is a schematic view of a laser incorporating the trigonal optical engine of FIG. 8.

The trigonally arranged optical engine of FIG. 8 was used in a high-power laser illustrated schematically in FIG. 9. Each 1.2-cm Nd:YAG rod 10 of the three engines 50, 52, and 54 was optically pumped by a high-power optical diode (Model SDL-3470-S available from SDL, Inc.) that was 1-cm long and output 20 W of optical power. The three engines were symmetrically oriented about the common optical axis 56 with separations between them of 1 cm. Two mirrors 64 and 66, separated by 30 cm and having concave radii of 100 cm, formed an optical cavity about the engines. One mirror 64 was coated for high reflectivity at 1.064 $\mu$m, and the other mirror 66 was coated for 85% reflectivity at 1.064 μm so as to output a laser beam 68. A high-index glass plate 67 (Model SF-10 available from Schott) was inserted into the cavity at Brewster's angle to linearly polarize the output 68. This laser produced an output beam 68 that was highly diffraction-limited, highly polarized, and having 11 W of optical power.

The laser of FIG. 9 can be constructed with additional mirrors and incorporating additional intra-cavity elements 70, such as a Q-switch. The embodiment of FIG. 9 was constructed to produce a diffraction-limited beam by controlling the size of the fundamental mode, but, if it were made to be multi-moded, higher output power would be available.

EXAMPLE 5

In one embodiment, the extra element 70 was an acousto-optic Q-switch. The resultant Q-switch laser produced a pulsed output of 1.064-μm light from Nd: YAG. When the mirrors were reconfigured to provide a multi-folded, re-imaging cavity with a total length of 1.5 m, the laser produced 1.5-mJ, 70-ns pulses at a 1-kHz repetition rate. Shorter cavities produced shorter pulses. Since the Nd:YAG generated over 6 dB of round-trip optical gain, a very short cavity and an electro-optic Q-switch could be used to generate optical pulses of less than 10-ns pulse width.

EXAMPLE 6

Figure 10:
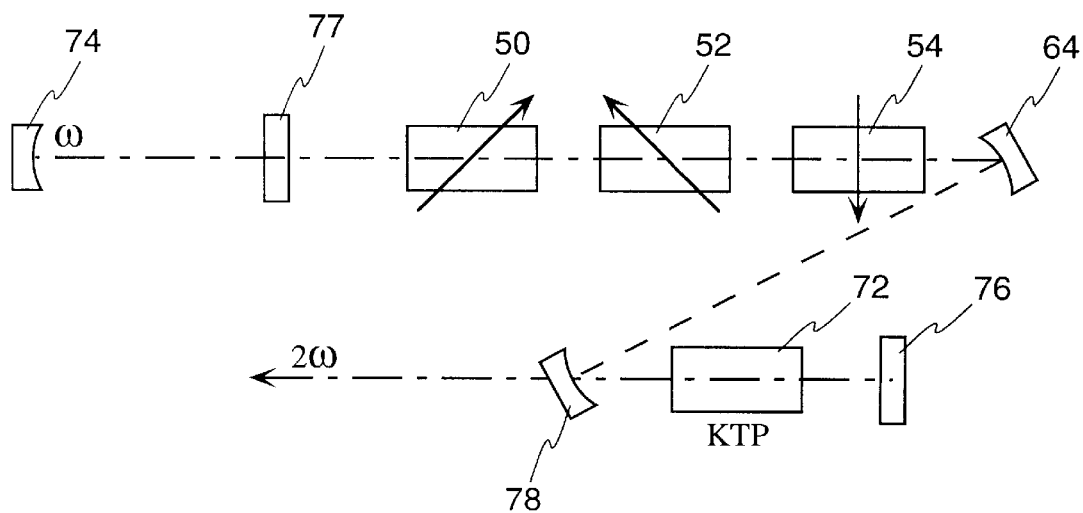
FIG. 10 is a schematic view of a frequency-doubling laser similar to that of FIG. 9.

In another variant, as illustrated in FIG. 10, a KTP (potassium titanyl phosphate) crystal 72 is placed at a 40-μm waist in a Z-shaped cavity formed by four mirrors 64, 74, 76, and 78. The non-linear optical characteristics of KTP causes it to act as a frequency doubler in the presence of high-intensity light. Two mirrors 64 and 74 are highly reflecting at 1.06 μm and have a radius of curvature (ROC) of 30 cm. A middle exit mirror 78 with a ROC of 10 cm is reflecting at 1.06 μm and is more than 95% transmitting at 0.53 μm. The end mirror 76 is flat and highly reflecting at both 1.06 μm and 0.53 μm. This mirror 76 reflects the 0.53 μm travelling in its direction back through the KTP crystal 72, combining it with other directions of 0.53 μm light. A waveplate 77 is also placed within the cavity to improve output power and stability by decoupling the two polarization modes in the KTP crystal 72.

With three 20-W CW laser diodes pumping the cavity, the 532-nm output was continuous (CW) and exhibited 5.5 W of optical power. This result compares to an end-pumped configuration of 400 mW of pumping power producing 4 mW of 532-nm light, as reported by Oka et al., "Stable intracavity doubling of orthogonal linearly polarized modes in diode-pumped Nd:YAG laser," Optics Letters, vol. 13, 1988, pp. 805–807.

In an alternate embodiment to that of FIG. 8, a single, longer laser rod 10 passes through the copper blocks 40 of all three optical engines 50, 52, and 54. The single rod reduces the number of coated surfaces and undesired reflections therefrom and reduces the alignment tolerances from rod to rod.

A number of variations of the simple optical engine of FIGS. 6 and 7 will now be described although it will be understood that these variations can be applied to the more complex configurations.

The alignment of the incident pump radiation with the central axis of the rod, as is illustrated in FIG. 6, provides the uniformity of two-fold symmetry. However, the slit 44 and the pumping direction can be aligned off the rod's optical axis, and the pump light will still be substantially confined within the cavity. Furthermore, the off-axis incidence prevents immediate back reflection into the diode through the slit 44.

A gold coating provides a nearly optimal reflective layer because of its highly reflective characteristics. However, beneficial effects can be obtained with other highly reflective coatings, such as dielectric stack mirrors. By highly reflective is meant a reflectivity facing the rod of more than 90% at the frequency (wavelength) of the pump light. The experimental examples used a 350 μm slit on a 1.2-mm diameter rod so that 0.186 of the circumference is not reflective. Preferably no more than 25% of the circumference should be not highly reflective to obtain the best benefits of the invention.

The efficiency η of absorption can be analytically expressed for a rod having a diameter d as $$\eta = \frac{2\alpha d}{2\alpha d + \pi \beta}, \quad (1)$$

where α is coefficient of absorption for the pump light and β is the loss on reflectance from the cavity wall. Taking into account not only the reflectivity R of the cavity wall but also the additional loss through the slit of width w, $$\beta = (1 - R) + \frac{w}{2\pi d} \quad (2)$$

when w<2πd. For example, if α=3 cm, d=1 mm, R=99% for gold, and w=350 μm, then β=0.0657 and π=90%. This value for η compares to 18% for a single pass through a 1-mm rod and 33% for a double pass. Equation (1) is based upon an average chord length through the rod, and a computer ray trace gives a more exact, even higher value for the efficiency η. Thus, the geometry of the invention can provide at least 75% efficient absorption of the pumping light.

The above embodiments have all relied upon a nearly perfectly specular reflector uniformly laterally surrounding the lasing medium. These requirements can be advantageously relaxed in a number of ways while nonetheless utilizing the advantages of the invention.

Specular reflections are by nature non-uniform (although a large number of reflections inside a closed cavity will tend to randomize the intensity distribution). A nearly uniform distribution within the optical cavity is important for efficient generation of the gaussian-shaped fundamental mode of a stable resonator. In order to increase the uniformity, a scattering component can be introduced both at the slit entrance and at internal reflecting wall of the optical cavity. Such scattering can be effected by the customary fine grinding of the surface of the barrel of the laser rod. The ground surface scatters the pump light both upon entrance into the laser rod within the optical cavity and upon each wall reflection. Alternatively, the reflective wall of the optically reflective and thermally conductive block can be textured to increase the amount of scattering. These techniques provide a non-specular but highly reflective wall to the optical cavity.

In some applications, it is desired that the lasing cavity produce other than the circularly symmetric mode. For example, if the end faces of the laser rod are angled at Brewster's angle in order to expand the diameter of the fundamental mode in one dimension, as described by Wallace et al. in U.S. Pat. No. 5,103,457, a circularly symmetric gaussian optical beam outside of the rod will require an elliptically shaped beam (and pump light distribution) within the rod. Insofar as the walls of cavity are not scattering, the light distribution tends to an elliptical shape within the cavity, and the desired external circularity can be improved by aligning the angled end face such that the radiation direction of the diode bar lies parallel to the plane of the end face.

The invention can use most of the known solid-state laser materials, but a number of specific materials are preferred. These materials include Nd:YAG, Nd:YLF, Tm:YAG, Nd:YVO$_4$, Nd-doped glass, and Yb:YAG. Some of these materials will lase at more than one wavelength, and the invention is suited to both the dominant lasing wavelength and the secondaries, such as 1.064 $\mu$m and 1.319 $\mu$m in Nd:YAG. Experiments have demonstrated that with at least Nd:YAG, the dopant level can be less than the usual 1.0 atomic %. Successful results have been obtained with 0.6%, and even lower doping levels are usable with the invention. Thus, it is no longer necessary to sacrifice the crystalline quality of the lasing material in order to achieve satisfactorily high doping levels. Also, new materials for lasing can be considered which heretofore have not had sufficient absorption for efficient operation.

The same inventive effects can be achieved if the laser rod or slab, rather than the surrounding thermal sink, is coated to have a high reflectivity except along an axial slit that admits the pump radiation into the optical cavity. Of course, at least one of the longitudinal ends needs to be at least partially transmissive depending on the application of the optical engine.

The embodiment of FIGS. 6 and 7 achieves good thermal contact with an adhesive between the laser rod and the thermally conductive, heat-sinking block. Alternatively, the material of the highly reflective and thermally conductive block can be chosen to be moderately soft so that the block can be pressed against the side of the rod and deform into intimate contact with the rod. A variety of standard clamps can be used and will not be described in detail. A notch in the block on the side opposite the slit will relieve stresses produced by the clamping. Of course, clamping eliminates the need for adhesive or other flowable thermal contacting material between the rod and cooling block.

Figure 11:
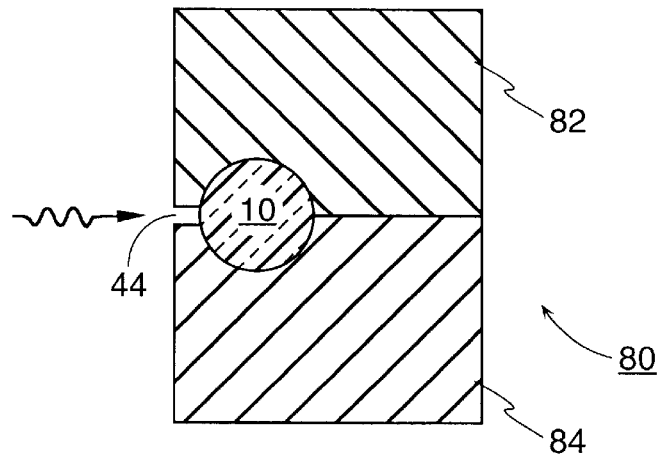
FIG. 11 is a cross-sectional view of a segmented cooling block enclosing a laser rod.
Figure 12:
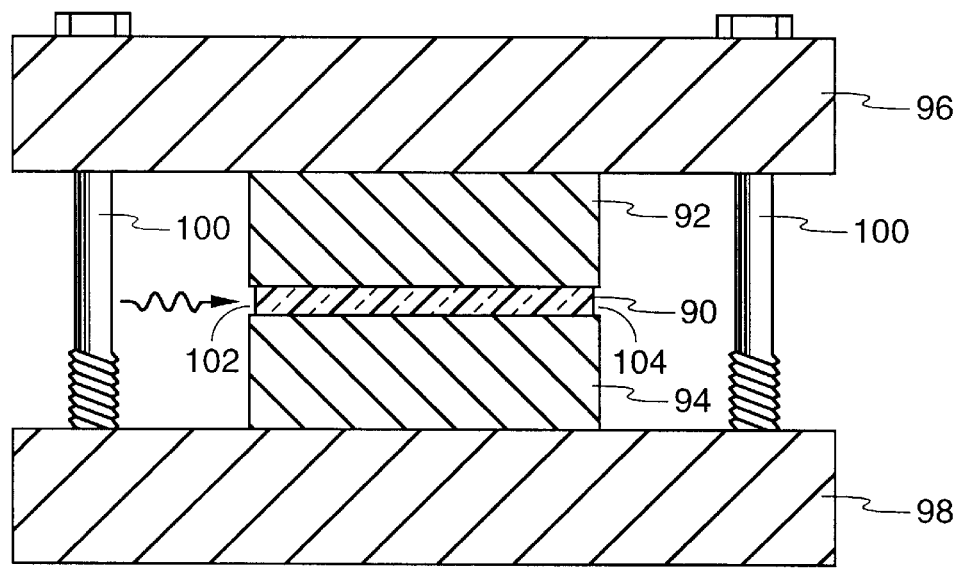
FIG. 12 is a cross-sectional view of a segmented cooling block enclosing a laser slab and pressed by a clamp.

In place of the unitary cooling block of FIG. 6, a cooling block assembly 80, as illustrated in FIG. 11, is divided into two or more body segments 82 and 84 which, when assembled together, form both an optical cavity for accommodating the laser rod 10 and the aperture 44 for entry of the pumping light into the optical cavity. The rod 10 can be thermally sunk to the assembly 80 either by transparent adhesive or by a clamp exerting force in the illustrated vertical direction. As illustrated in FIG. 12, a segmented cooling block is useful also with a rectangular laser slab 90 sandwiched between two separately cooled rectangular blocks 92 and 94. The blocks 92 and 94 can be secured to the laser slab 90 with transparent adhesive. Alternatively, a clamp assembly has two jaw members 96 and 98 that are pressed together by rotating screws 10 passing through the upper jaw member 96 and threaded into the lower jaw member 98 to thereby force the segmented cooling blocks 92 and 94 into intimate contact with the laser slab 90. The clamp assembly is presented only for relational purposes and could be substituted with other and possibly better clamping means. Although not illustrated, a slitted reflective surface and a fully reflective surface are preferably added to the slab's lateral sides 102 and 104 respectively. However, cooling of the sides 102 and 104 in this planar geometry is not so necessary.

Figure 13:
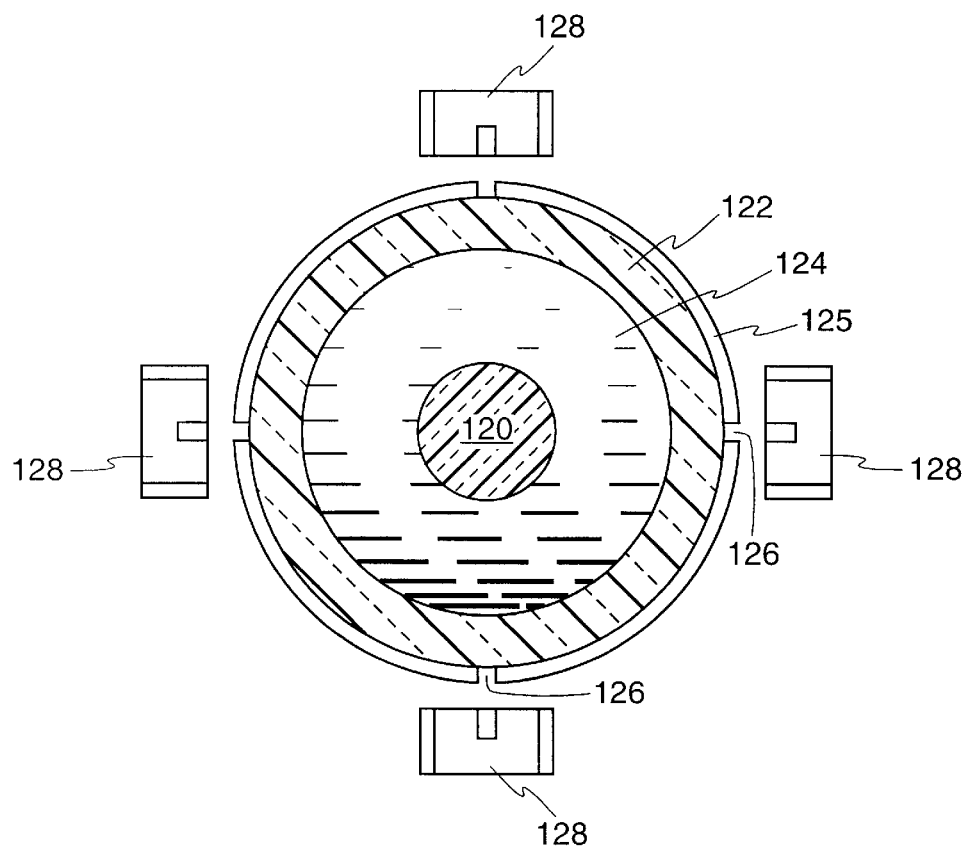
FIG. 13 is a cross-section view of a second major embodiment of the invention.

A second major embodiment of the invention is shown in cross section in FIG. 13. A laser rod 120 is suspended at the center within a transparent flow tube 122. The laser rod 120 can be physically supported at ends beyond the optical interaction region or by fine supports within the interaction region that do not interfere with the pumping light. A cooling liquid 124 flows axially through the flow tube 122 adjacent to the laser rod 120 throughout the optical interaction region so as to cool the rod. The cooling liquid can be water or ethylene glycol, for example. A surface, preferably the outer surface, of the flow tube 122 is coated with gold or other highly reflecting layer 125 so as to form an optical cavity therein. However, thin axial slits 126 are formed in the gold or other highly reflecting layer 125 to admit pump light into the optical cavity. The slits 126 are filled with an anti-reflection coating so as to optimize optical coupling.

In this embodiment, the extra size of the flow chamber and flow tube allows multiple laser bars 28, four in the illustrated embodiment, to be circumferentially arranged along the same axial portion of the laser rod 120 in a symmetric arrangement. The heat removal from the laser material 120 is also symmetric and efficient, allowing the invention to be scaled to kilowatts of laser output.

Characteristic dimensions for this embodiment can vary widely to achieve outputs of different powers and optical characteristics.

Figure 14:
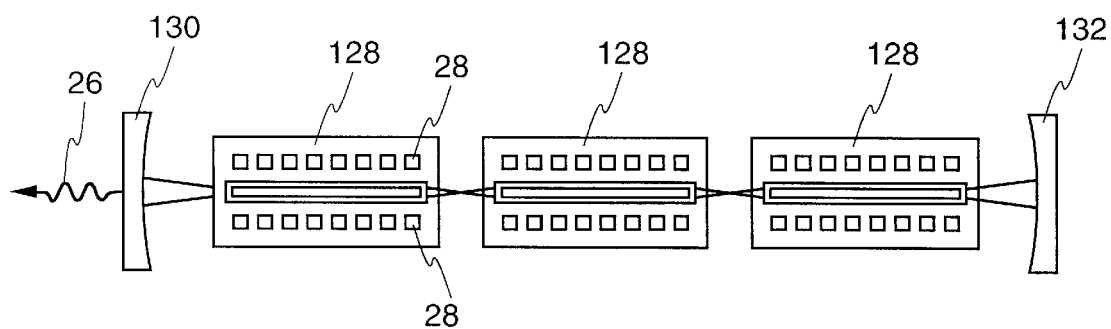
FIG. 14 is a plan view of a multi-stage, high-power optical engine of the invention.

A first example is a kilowatt-level multi-mode Nd:YAG laser in which the laser rod 120 is a standard rod that is 6.3 mm and 15 cm long and is mounted in a 9-mm ID quartz tube 122 with a wall thickness of 1.5 mm. The rod 120 is held by collar within and at the ends of the quartz tube 122. Water cooling ports are laterally arranged at the tube ends similarly to the flow-tube method used to cool laser rods in many lasers pumped with arc lamps. The outside of the quartz tube 122 is gold coated for high reflectivity at all angles for pump light at 808 nm except for four 350-$\mu$m slits 126. As illustrated further in plan view in FIG. 14, along each of the four slits 126 in each assembly 128 there are arranged fourteen 1-cm long high-power diode bars 28, for a total of 280 W per slit 126 for currently available diodes. With four slits 126, the rod receives 1120 W of pump power and should produce about 400 W of optical output within each assembly. The number of azimuthally arranged slits 126 may be freely chosen up to the physical constraints of the associated diode bars 28. The laser rods 120 of three such assemblies 128 are axially aligned between mirrors 130 and 132 forming an optical cavity so as to produce a laser having optical output power of greater than 1 kW.

A second example for a single assembly 128 is a 50-W diffraction-limited laser. The laser rod is made from Nd:YAG to be 1.5 mm in diameter and 10 cm long. The tube has an internal diameter of 3 mm and a 0.5-mm wall thickness, and it is made from either sapphire for additional strength or from the more usual glass or fused silica. Twelve 20-W diode bars arranged along two or three slits to illuminate the length of the rod will produce about 50 W of TEM$_{00}$ power. The smaller diameter rod does not suffer loss of absorption efficiency because the pump light is trapped until it is absorbed.

Lasers using the above described water cooling can be incorporated into the previously described optical devices. In particular, Q-switching can provide very high power pulses while non-linear intra-cavity crystals can alter the output wavelength of the laser.

The invention thus provides a highly efficient laser or other optically active device that can be operated at very high powers. The geometry is amenable to producing a desirable circularly symmetric TEM$_{00}$ mode because of the small diameter laser rod that is possible, the uniformity of pump light within the rod, and the good thermal control. The design is flexible, it can be used with a variety of optical diode sources, it can be incorporated into many types of optical devices, and it can be scaled to yet higher powers.

What is claimed is:

1. A multi-stage optical engine, comprising a plurality of single-stage engines, each said single-stage engine comprising:
   a rod of a lasing medium extending along an optical axis,
   a reflective layer formed around said rod and including a slit therein extending in parallel to said common axis,
   a semiconductor diode bar comprising a plurality of semiconductor lasers directed at said slit, and
   a heat sinking medium in thermal contact with said rod substantially over a circumference of said rod excluding said slit;
   wherein said single-stage engines are positioned about said optical axis to direct radiation from different ones of said single-stage engines along different azimuthal directions with respect to and substantially perpendicular to said optical axis;
   wherein respective rods of all of said single-stage engines comprise a single continuous rod passing through all said single-stage engines longitudinally arranged along said optical axis; and
   wherein said continuous rod extends between said single-stage engines in areas out of contact with any of said heat sinking media.

2. A multi-stage optical engine as recited in claim 1, wherein said diameter is no more than 1.6 mm.

3. A multi-stage optical engine as recited in claim 2, wherein said plurality of single-stage engines consist of two of said single-stage engines and wherein said different azimuthal directions are separated by about 90°.

4. A multi-stage optical engine as recited in claim 2, wherein said plurality of single-stage engines consist of three of said single-stage engines and wherein said different azimuthal directions are three directions separated from each other by about 120°.

5. A multi-stage optical engine as recited in claim 2, wherein said diameter is no more than 1.2 mm.

6. An optical engine, comprising:
   an optically active body extending along a longitudinal axis;
   a thermally conductive body in thermal contact with said optically active body and having an aperture extending along said longitudinal axis with sides extending in a direction transverse to said longitudinal axis; and
   a semiconductor laser diode positioned to irradiate optical energy through and closely accommodated by said aperture into said body;
   wherein said sides are sized to multiply reflect said optical energy from said laser diode.

7. An optical engine as recited in claim 6, wherein said sides are coated with a reflective coating.

8. An optical engine as recited in claim 6, wherein said optically active body is a rod.

9. An optical engine as recited in claim 8, wherein said rod has a diameter of no more than 1.6 mm.

10. An optical engine as recited in claim 9, wherein said diameter is no more than 1.2 mm.

* * * * *